Figure 1:
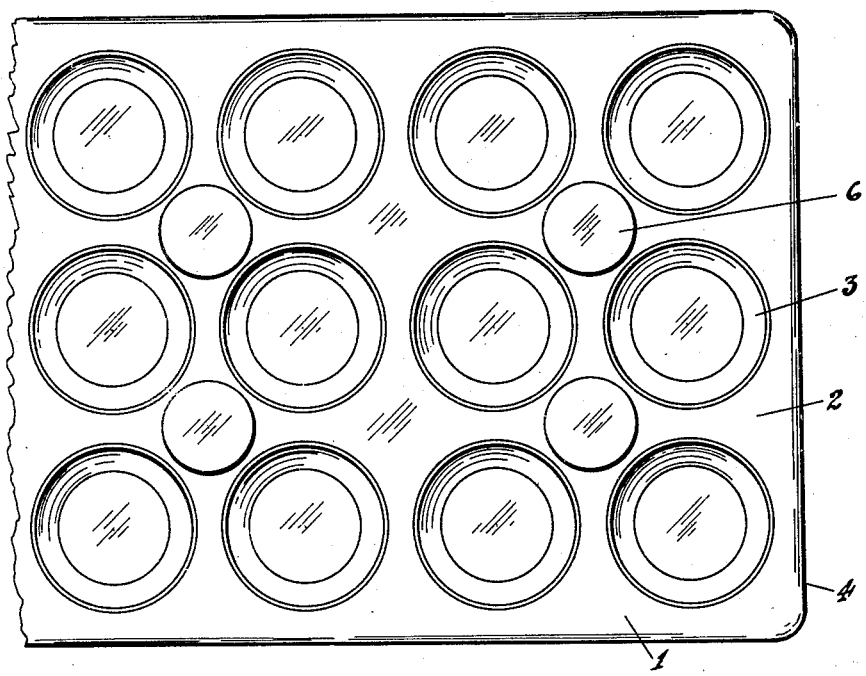
Figure 2:
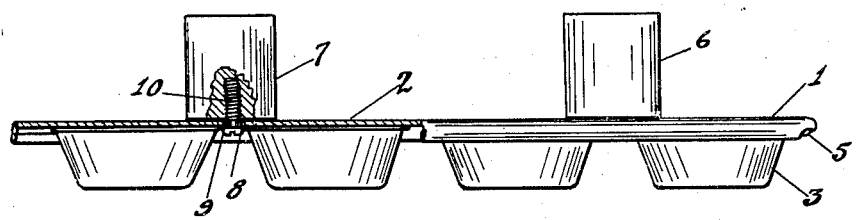
Figure 3:
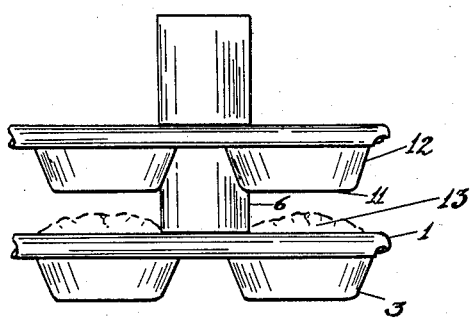

Jan. 21, 1930.  A. KATZINGER  1,744,552

CAKE PAN

Filed Jan. 6, 1928

Arthur Katzinger.
Inventor.
O. W. A. Darrah
Attorney.

Patented Jan. 21, 1930

1,744,552

UNITED STATES PATENT OFFICE

ARTHUR KATZINGER, OF CHICAGO, ILLINOIS, ASSIGNOR TO EDWARD KATZINGER COMPANY, OF CHICAGO, ILLINOIS, A CORPORATION OF ILLINOIS

CAKE PAN

Application filed January 6, 1928. Serial No. 244,918.

This invention relates to containers, of a type which are primarily intended for the baking of food products, although other applications may be made.

The object of this invention is to provide a means whereby a set of pans may be stacked one above the other, without having the pans come in such close contact that circulation of air and consequent loss of heat is prevented. Another object of this invention is to provide a process for making cakes which is materially quicker, more economical and more sanitary than the present process. Other objects of this invention will be apparent from the description which follows, from the claims and from the attached drawings.

Referring to the drawing:

Fig. I shows a plan view of one form of my invention.

Fig. II shows a side elevation partly broken away, while

Fig. III shows a partial side elevation indicating a typical arrangement of pans made in accordance with my invention when stacked.

Referring to the drawings (1) indicates a pan which may take a variety of shapes or forms, but which is shown composed of a deck portion (2) containing a multiple of cups or depressions (3) and surrounded by rolled edge (4) in which is placed a reinforcing member (5) in the form of wire or other shape. In the drawing I have shown the depression (3) as circular in section and tapered from the top toward the bottom thus providing a multiple of cylindrical tapered cakes. Distributed between the various depressions I have placed a series of spacing members (6) which is also shown partly broken away as (7) in Fig. II. Many modifications of shape and construction are possible for this member, but it is desirable that it be smooth, free from projections, crevices or joints and firmly and permanently attached to the top deck portion (2) of the set of pans. For purposes of diagrammatic illustration, I have shown member (7) attached to deck (2) by means of a screw (8) which passes through a hole (9) in deck portion (2) and is threaded at (10) into the middle of spacer (7).

It is desirable to keep the separation between the pans materially more than the depth of the depression (3). This being the case it would be inconvenient in many instances to place the spacing members (6, 7, etc.) on the bottom of deck member (2) extending downward as this would cause the pans to rest on the spacing members when they were being filled or handled or during the baking process. I, therefore, consider it an advantage to place the spacing members extending upward from the top of the deck portion of the pan and prefer a height for the spacing member materially greater than the depth of the pan and preferably even greater than the depth of the pan, plus the amount which the dough rises during the manufacturing process. It is of course obvious that it is undesirable for the bottom portion (11) of depression (12) from coming into contact with the top portion (13) of the cake in pan (3).

Obviously as many sets of these pans may be stacked one upon the other as is desired and the exact shape of the depressions may be as required by convention in manufacturing the various types of food products.

The applicant wishes to point out that in the case of most bread and many other bakery products, it is not feasible to cool the baked article in the pan because the condensation of moisture upon the pan and baked article (commonly known as "sweating") produces an inferior grade of product which is likely to mold or become otherwise undesirable. In the cooling, therefore, of bread and similar articles it is customary to expose the bread where possible on all sides to air, thus allowing the free escape of moisture. On the other hand, in the case of cake this is not as important and particularly in the case of what are known as cup-cakes. Products of this class may successfully be cooled in a baking pan without removal providing means are available for spacing the pans, so that a circulation of air will remove the heat. It obviously is not practical to pile a set of standard pans one upon the other as this arrangement would not only serve to retain the heat much longer than is desirable, but would also involve the possibility of damaging the contents of the pans. It is present practice, therefore, to remove the cakes from the pans and cool the pans separately from the cakes. This makes it necessary to provide storage trays for holding the cakes and other storage racks or equipment for holding the pans. When it is considered that a large commercial bakery may turn out daily as many as 70,000 dozen cakes of this nature, the space problem will be appreciated.

On the other hand, pans made in accordance with my invention make it possible for the cakes to be cooled in the pans, by merely placing them one above the other. Such procedure avoids damaging the cakes, makes it possible to cool the cakes and pans rapidly, economizes space and eliminates handling as the cakes may be sent directly from the cool pans to the shipping room. The advantages outlined above are not obtainable with any of the equipment used today.

It will be understood that my invention is not confined to the exact type of construction or arrangement shown on the drawings and described in the specification and claims. Many obvious modifications may be made and still come within the scope of my invention.

It will be apparent from the disclosures here made that the process which I have devised differs from present commercial processes by the inclusion of the step of cooling the cakes in the pan instead of cooling the cakes out of the pans. In addition to the advantages outlined above, this procedure also results in cakes which have lost less weight by evaporation, which therefore contain more moisture and are softer and more palatable. Cakes made in accordance with my process also offer less opportunity for the removal of volatile flavoring materials through evaporation. This is partly the result of the reduced surface which is exposed to the cooling period.

There is further an advantage in cooling the cakes in a set of pans rather than individually, in that the cooling is more gradual and more uniform. The more gradual uniform cooling obtained when the cakes are cooled in a stack of pans rather than individually has a tendency to reduce the possibility of sudden shrinkage or decrease in volume which is sometimes commercially known as "falling."

Having now fully described my invention what I claim as new and wish to secure by Letters Patent in the United States is as follows:

1. A set of baking pans consisting of a horizontally extending deck portion, a series of circular tapered depressions within said deck portion, a reinforcing structure around the edge of said deck portion, and a series of upwardly extending substantial posts serving as spacing members fastened at their lower portion to said deck member, and located a considerable distance from the edges of said set of pans, said spacing members extending upwardly a distance greater than the maximum depth of said pan.

2. A set of baking pans consisting of a horizontally extending deck portion, a series of circular tapered depressions within said deck portion, a reinforcing structure around the edge of said deck portion, and a series of upwardly extending substantial posts serving as spacing members fastened at their lower portion to said deck member and located a considerable distance from the edges of said set, the vertical extent of said spacing member being greater than the maximum depth of the article baked in said depressions, said spacing members having a sufficient area to support a large number of loaded pans.

3. In a multiple set of baking pans a deck portion, depressions therein, substantial posts serving as spacing members arranged between said depressions and extending vertically upward from said deck portion, the vertical height of said spacing members being greater than the maximum depth of the depressions in said deck portion, said spacing members having sufficient area to support a large number of loaded pans.

ARTHUR KATZINGER.